(No Model.)
J. E. H. PADDON.
VENTILATOR.
No. 537,479. Patented Apr. 16, 1895.
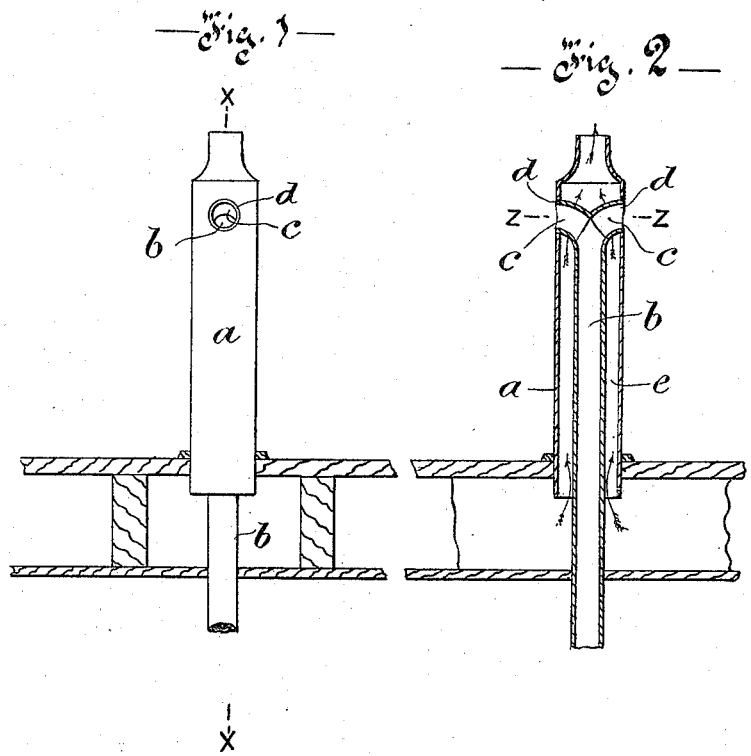

UNITED STATES PATENT OFFICE.

JAMES E. H. PADDON, OF MONTREAL, CANADA.

VENTILATOR.

SPECIFICATION forming part of Letters Patent No. 537,479, dated April 16, 1895.

Application filed July 5, 1894. Serial No. 516,669. (No model.) Patented in Canada March 27, 1894, No. 45,636, and May 9, 1894, No. 45,992.

*To all whom it may concern:*

Be it known that I, JAMES EDMUND HENRY PADDON, of the city of Montreal, in the district of Montreal and Province of Quebec, Canada, have invented certain new and useful Improvements in Ventilators, (for which I have obtained Letters Patent of the Dominion of Canada, No. 45,636, dated March 27, 1894, and No. 45,992, dated May 9, 1894;) and I do hereby declare that the following is a full, clear, and exact description of the same.

My invention although applicable to all kinds of ventilating pipes taken through roofs relates more especially to soil-pipe ventilators and its object is to prevent that portion of same projecting above the house top from becoming clogged by the freezing of the moisture in the gas escaping through it to the open air, and it may be said to consist, broadly, in the combination with the soil pipe ventilator, of an inclosing pipe or conductor having one or more openings in its sides and the soil pipe ventilator having its upper end bent or offset to communicate with such opening or openings.

For full comprehension however of the invention, reference must be had to the annexed drawings, forming a part of this specification, in which like symbols indicate corresponding parts, and wherein—

Figure 1 is a side elevation of my improved form of ventilator; Fig. 2, a vertical section of same on line $x\ x$ Fig. 1, and Fig. 3 a horizontal section of same on line $z\ z$, Fig. 2.

The hot air may be conducted from the building and applied to the exposed portion of the ventilator by various forms of mechanism of which I have shown what I believe to be the simplest and best construction.

$a$ is the hot air conducting pipe or jacket extending upward from a point below the roof where its open lower end communicates with the heated atmosphere of the building, the upper end of this pipe being preferably contracted as shown or otherwise finished in shape or design as may be desired.

$b$ is the soil pipe ventilator which in this case is shown with a double or V-shaped end composed of two branches $c\ c$ each of which is curved or turned outward to communicate with openings $d\ d$ in the sides of the inclosing pipe. From this construction it will be seen that every part of the soil pipe ventilator is inclosed and further that there is no possibility of the foul air from same being driven by any chance down the inclosing pipe opening into the building, while a current of heated air is continually passing up through the space $e$ between the ventilator $b$ and the jacket $a$, as indicated by arrows in Fig. 2, thereby causing a comparatively high degree of temperature and effectively preventing the freezing of the moisture in the air or gas passing through the ventilator $b$.

It will be evident that while acting as a hot air conductor to the soil pipe ventilator, the inclosing jacket also serves as a ventilator for the house itself.

What I claim is as follows:

1. The combination with a soil pipe ventilator, of an inclosing pipe or conductor communicating with the interior of the building and having an open outer end and one or more openings in its sides, and said soil pipe ventilator having its upper end bent or offset to communicate with such openings for the purpose set forth.

2. The combination with soil pipe ventilator $b$ having the branches $c\ c$, forming a V-shaped end, of the inclosing pipe or conductor $a$ communicating with the interior of the building and having its outer end open and somewhat contracted and openings $d$ in its side with which said branches $c\ c$ communicate for the purpose set forth.

JAMES E. H. PADDON.

Witnesses:
 WILLIS McFEAT,
 FRED. J. SEARS.